United States Patent [19]

Killian et al.

[11] Patent Number: 5,406,044
[45] Date of Patent: Apr. 11, 1995

[54] DISPLACEMENT MONITORING SYSTEM FOR STUD WELDING

[75] Inventors: Michael L. Killian, Troy; Michael D. Orr, Northville, both of Mich.

[73] Assignee: Eaton Corporation, Cleveland, Ohio

[21] Appl. No.: 230,275

[22] Filed: Apr. 20, 1994

[51] Int. Cl.⁶ ............................................. B23K 9/20
[52] U.S. Cl. ...................................... 219/99; 219/98
[58] Field of Search .................................. 219/98, 99

[56] References Cited

U.S. PATENT DOCUMENTS

| | | | |
|---|---|---|---|
| 4,531,042 | 7/1985 | Shoup et al. | 219/99 |
| 5,030,815 | 7/1991 | Glorioso | 219/98 |
| 5,039,835 | 8/1991 | Schwiete | 219/98 |
| 5,070,226 | 12/1991 | Raycher et al. | 219/98 |
| 5,252,802 | 10/1993 | Raycher | 219/98 |
| 5,317,123 | 5/1994 | Ito | 219/98 |

*Primary Examiner*—Clifford C. Shaw
*Attorney, Agent, or Firm*—Jennifer M. Stec

[57] ABSTRACT

A system (10) and method for predicting weld quality in a stud welding system by measuring the displacement of a movable shaft (20) with respect to the gun body (12) during the weld process. A sensor (34) is positioned with respect to the welding system in order to produce a series of discrete signal values each indicative of this displacement. These values are plotted graphically and used to produce a weld "signature" which can be compared with signatures of welds of known quality to more accurately predict the quality of the current weld. Based on these weld signatures, various weld parameters including current, time and lift can then be adjusted until a consistent signature indicative of good weld quality is produced.

12 Claims, 3 Drawing Sheets

FIG 4
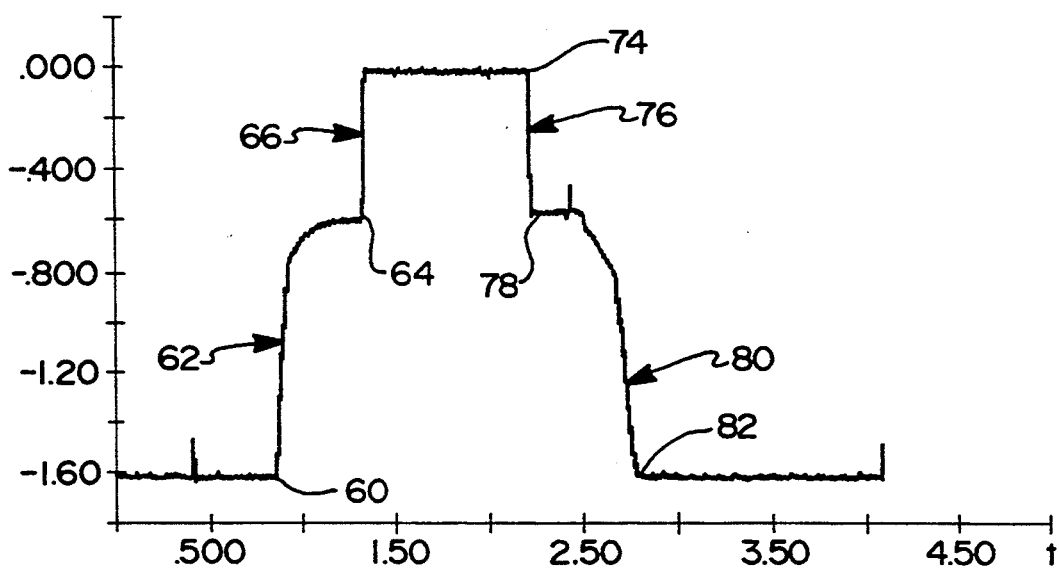
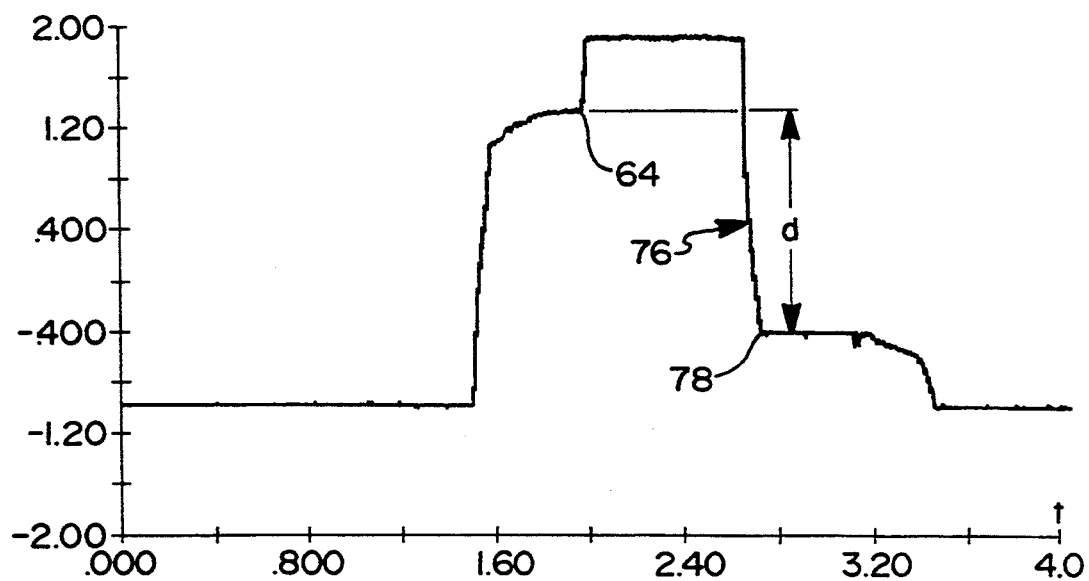
FIG 5

DISPLACEMENT MONITORING SYSTEM FOR STUD WELDING

BACKGROUND OF THE INVENTION

The present invention relates generally to manufacturing process monitoring systems and, more particularly, to a system and method for predicting stud weld quality by monitoring various parameters including linear displacement of the stud carrying shaft during the welding process.

A typical arc stud welding system includes a welding gun and an associated power supply and controller for the gun. The gun generally includes a gun body having a shaft extending outwardly therefrom which is mounted for reciprocal movement with respect to the body, between fully retracted and fully extended positions. The gun shaft is typically moved axially via the combination of an electric solenoid and a biasing spring, both held within the gun body. The movable shaft has a distal end having means such as a chuck for carrying the stud to be welded to the workpiece. The gun may also include one or more stationary legs, each of which may be fixedly connected to an annular ceramic ferrule which is mounted so as to substantially surround the stud, with the stud projecting axially slightly beyond the ferrule.

To begin the weld process the stud is brought into contact with the workpiece, with the shaft in its fully extended position. The stud carrying shaft is then compressed axially against the biasing spring until a bottom surface of the ceramic ferrule is also seated on the workpiece. An electrical current is applied to the shaft and stud in order to establish an arc between the stud and the workpiece. Thereafter, the stud is then "lifted" a predefined distance away from the workpiece, via actuation of the solenoid, into a fully retracted position of the shaft. The electrical arc creates a molten pool of metal on the workpiece surface into which the stud is to be attached and, at the same time, also begins to melt the metallic stud.

After a predetermined arcing time has elapsed, the controller deactuates the solenoid and the shaft is forcibly driven by the biasing spring so as to "plunge" the stud into the molten pool and thereby effect welding. The plunge actually forces the stud into the molten metal below the original surface of the workpiece and the length of the plunge is essentially equal to the amount of "lift" plus the distance the stud is allowed to travel below the original surface of the workpiece. The depth of penetration of the stud below the original workpiece surface typically varies with current magnitude, arc time and certain other plunge parameters.

The manner in which the weld between the stud and workpiece forms ultimately determines weld quality, and in particular the impact strength of the weld, i.e. whether the joint between the workpiece and stud is sufficient to adequately secure the stud to the workpiece in a stressed condition, such as upon the application of a striking force directly to the stud. The force to be withstood may vary with application but typically must approach a maximum in order for the weld to be considered to be of a "good" quality. This impact strength can be physically tested using a destructive testing technique such as repeated hammer blows and the results of such tests have traditionally been correlated to various weld parameters including weld current, arc time and voltage. During a given welding process, these parameters may be monitored and compared to certain predetermined ranges. Generally, when the measured parameters fall within these standard nominal ranges for each of the parameters, a good quality weld is predicted. When monitored conditions fall outside of the set ranges, the resultant welds are predicted to be of a poorer quality and adjustments to the welding system are usually made until predicted and tested "good" quality welds are produced.

However, in practice it has been found that while monitored conditions falling within certain parameter ranges generally results in a good quality weld, at times a poor quality weld has resulted even when all of the conventional parameters have been measured and have fallen well within the set acceptable ranges. Welds made in accordance with these prescribed parameters have from time to time failed physical impact tests, sometimes by a relatively large margin, thereby allowing poor quality welds to pass through these conventional process monitoring methods. While an operator of a manual welding station may be trained to visually spot certain indications of poor weld quality, such as an irregularly shaped or insufficient flash, this type of manual inspection is not infallible nor is it cost effective in an automated welding operation.

Probable causes for insufficient weld quality occurring in instances wherein all of the traditionally monitored parameters have fallen within a generally acceptable range may include mechanical malfunctions of the gun such as improper set-up, adjustment or alignment. Similarly, improper lift and plunge distances can likewise cause an unreliable weld even when all measured parameters fall within prescribed ranges. Therefore, there exists the need for an improved system and method for more accurately predicting stud weld quality without necessitating any visual or other inspection of the completed weld.

SUMMARY OF THE INVENTION

The system and method of the present invention addresses this need by defining an additional automatically measurable parameter which can be directly related to weld quality in an arc stud welding system. This parameter, the instantaneous displacement of the movable gun shaft with respect to the gun body, is measured continually during the weld process by a sensor adapted to output a series of discrete values indicative of the amount of this displacement. These values can be related directly to each of the steps in the weld process and thereby used to monitor weld parameters such as lift height and plunge distance.

These instantaneous displacement values can also be plotted graphically. A graph of the displacement with respect to time is used to produce a weld "signature" which can be compared to similar signatures of welds of known quality in order to more accurately predict weld quality. Variable weld parameters such as current magnitude, lift and weld time can then be adjusted until a signature indicative of good weld quality is consistently produced.

These and other objects and advantages of the present invention will become apparent from the following description, taken in connection with the accompanying drawings and appended claims.

BRIEF DESCRIPTION OF THE DRAWINGS

FIG. 4 is a graphical representation similar to that of FIG. 3 but illustrating the "signature" of a weld found to have fair to poor measured weld quality.

FIG. 5 is a graphical representation similar to FIGS. 3 and 4 which further illustrates a signature indicative of a good quality weld.

DETAILED DESCRIPTION OF THE PREFERRED EMBODIMENTS

Figure 1:
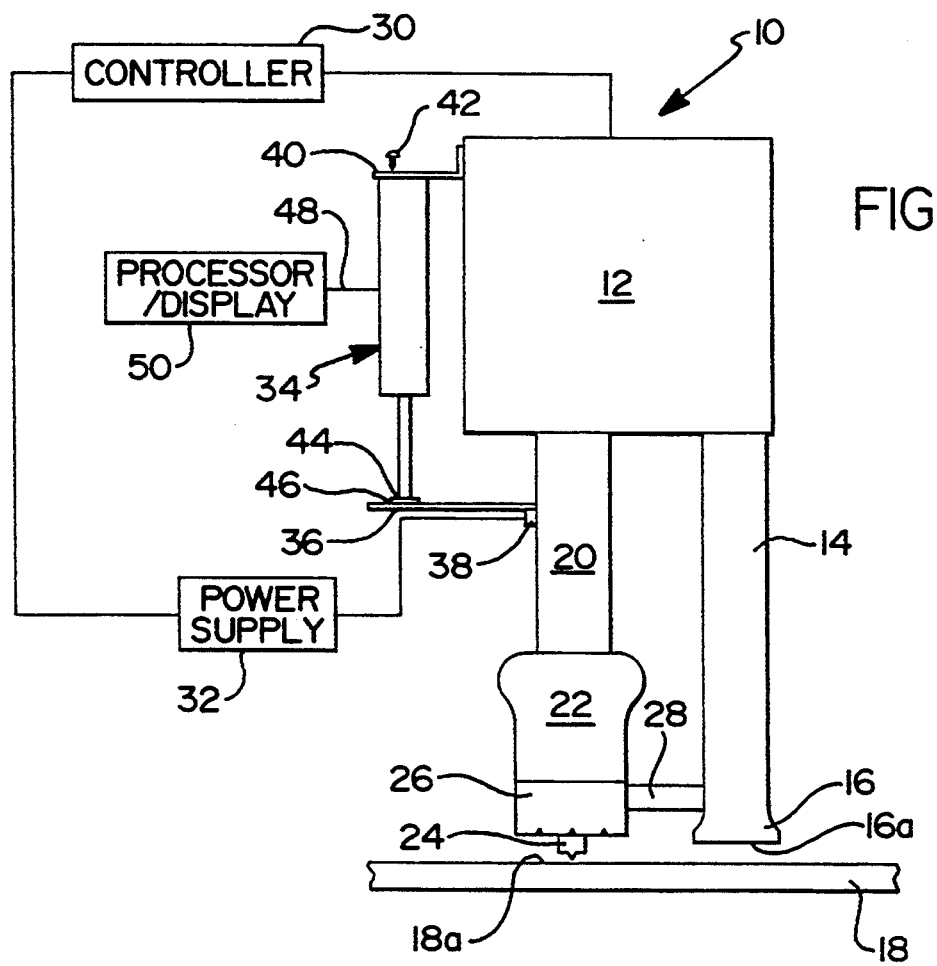
FIG. 1 is a diagrammatic view of a typical stud welding system having mounted thereto the displacement measuring and monitoring system of the present invention.

Turning now to the drawings, and in particular to FIG. 1, a stud welding process monitoring system, made in accordance with the teachings of the present invention, is indicated generally at 10. As shown therein the stud welding system consists of several main components. These components include a weld gun body 12 having attached thereto a stationary leg 14 having a foot 16 at one end. Mounted on gun body 12 adjacent stationary leg 14 is a movable shaft 20. One end of shaft 20 extends into the interior of gun body 12 and is preferably moved with respect thereto using a conventional actuation means such as a biasing spring and an electric solenoid (not shown). While the present invention is described herein with respect to a stud welding system of this general type it will become apparent that the system and method of the invention is readily applicable to a wide variety of different types of welding system configurations, such as those employing a stepping motor rather than a solenoid and spring combination.

The opposing end of shaft 20 has attached thereto a chuck 22 used to carry a stud 24. An annular ceramic ferrule 26 is fixedly mounted to stationary leg 14 or foot 16 via an appropriately configured member 28 and is disposed so as to substantially surround stud 24, with the stud projecting slightly therepast. The ferrule 26 limits the amount of air near the weld as well as contains the weld fillet and prevents weld spatter. Reciprocal movement of shaft 20, and therefore chuck 22 and stud 24, is preferably controlled via the biasing spring and solenoid (not shown), the solenoid being controlled electrically by a connected microprocessor based controller 30. Controller 30 may also control the application and magnitude of electrical power delivered by a power supply 32 to shaft 20 in order to effect arcing.

FIG. 1 further illustrates a first preferred embodiment of the present invention wherein an LVDT (Linear Variable Displacement Transducer) 34 is mechanically mounted between the welding gun 12 and movable shaft 20 in order to measure relative displacement therebetween. LVDT 34 preferably includes a target 36, which in the presently preferred embodiment is an aluminum bracket mounted to the power terminal 38 on the gun shaft 20. A second bracket 40 is then mounted, such as by adhesive bonding, to an outside surface of the gun body 12. Bracket 40 is likewise preferably made of aluminum or other lightweight material. The LVDT 34 is securely held in the bracket 40, such as by one or more threaded fasteners 42. However, any other suitable means for securing LVDT 34 between gun body 12 and shaft 20 could alternately be used. To ensure adequate electrical insulation for the sensor, the extending tip 44 of LVDT 34 preferably rides against a nonconductive surface, preferably a plastic pad 46 which has been adhesively bonded over target 36.

LVDT 34 thereby is adapted to generate an output signal to an output line 48 which is indicative of the instantaneous relative displacement of shaft 20 relative to the gun body 12. Output line 48 is preferably connected to a suitable signal processing and display device 50, such as a personal computer and attached monitor. Device 50 may alternately be any type of device or combination of devices, such as a strip recorder and/or oscilloscope, preferably capable of producing a graphical representation of the measurement data obtained by LVDT 34 of the type shown in FIGS. 3–5 wherein measured displacement distance is plotted with respect to time.

Figure 2:
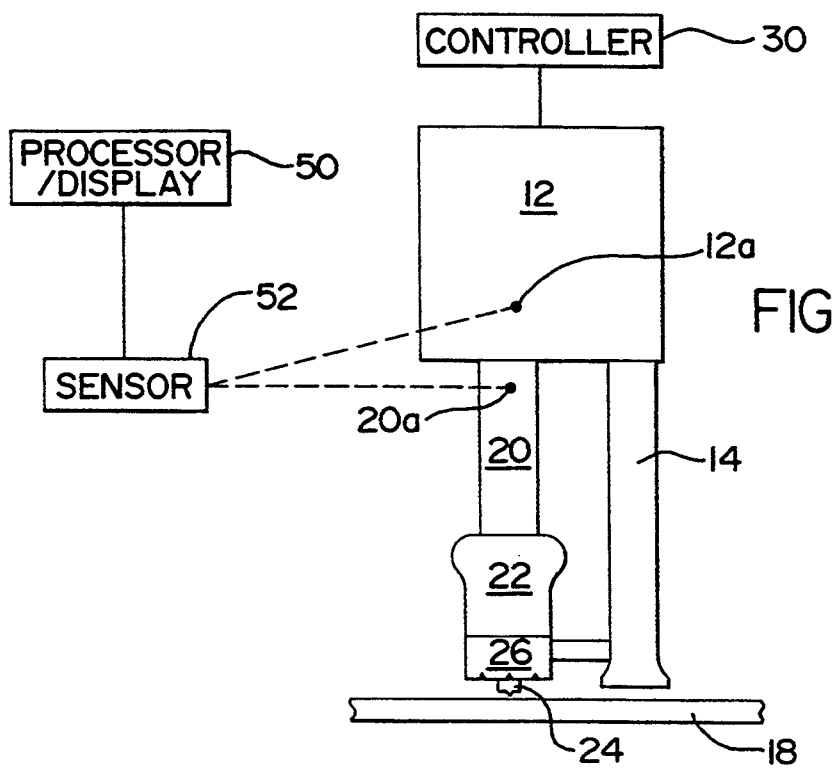
FIG. 2 illustrates a second embodiment of the process monitoring system of the present invention which employs an optical displacement measuring device.

Alternately, however, other suitable means for measuring displacement between the stud and gun body could also be employed. FIG. 2, for instance, illustrates a welding device substantially as shown in FIG. 1 wherein LVDT 34 is replaced with an optical sensor 52, such as a CCD camera or other laser or light-based sensor. Optical sensor 52 is preferably positioned so as to measure the changing distance between a selected target point 12a on gun 12 and a corresponding selected target point 20a on shaft 20. These and many other sensor configurations well known to those having skill in the art can be used to measure and monitor the displacement of the stud during the lift and plunge operations.

Figure 3:
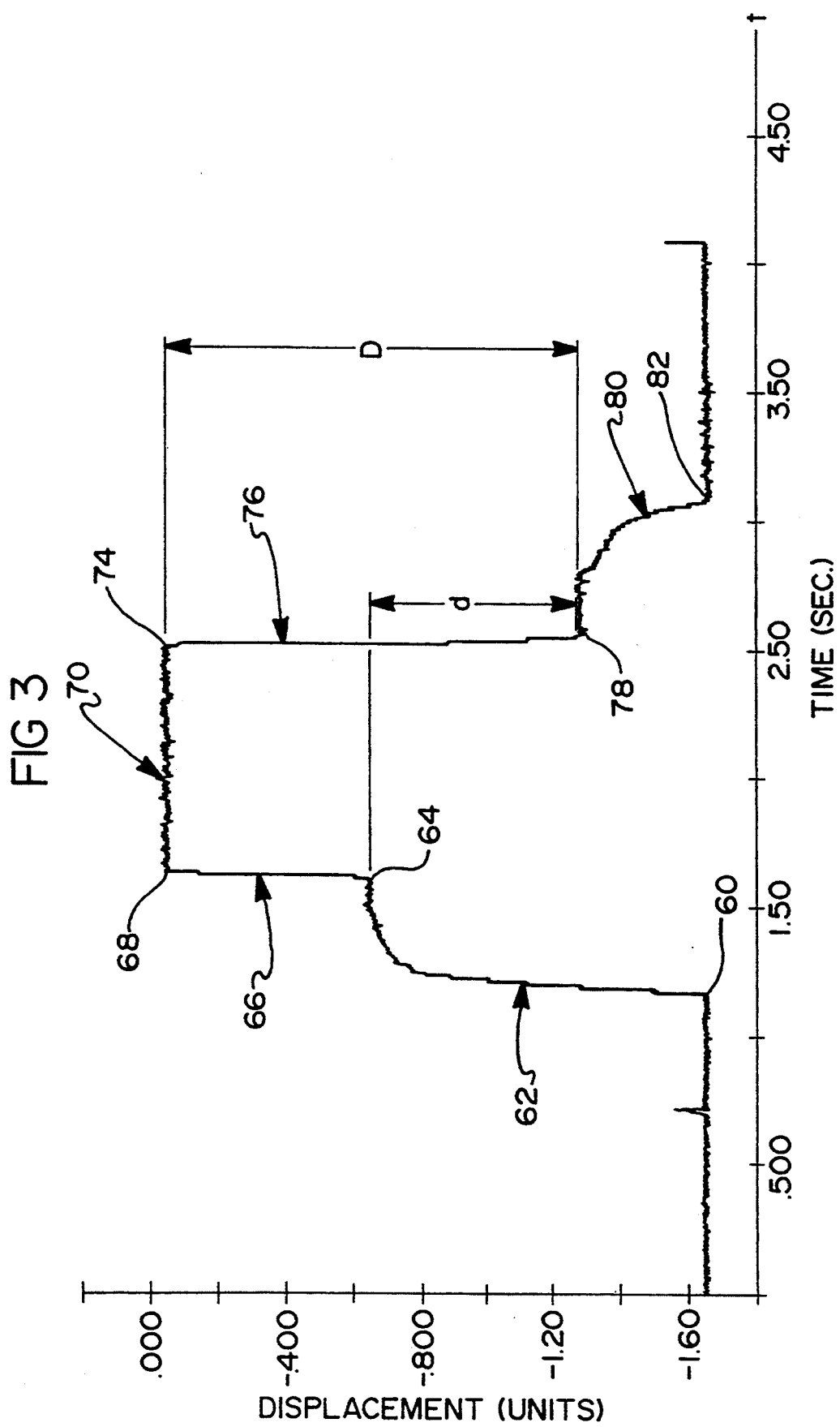
FIG. 3 is a graphical representation of measured displacement values versus time obtained in the production of a good quality weld.

To make the best use of these measurements, they are preferably displayed in the form of a graph of the kind shown in FIGS. 3–5. In these graphs the magnitude of the linear displacement is plotted on the ordinate, against time on the abscissa. FIG. 3 shows the curve typically obtained in a good quality weld. However, it should be pointed out that the measurement data plotted in the graphs shown in these figures has been automatically scaled and therefore the displacement shown therein is somewhat exaggerated. However, the data contained therein could be appropriately scaled in order to provide more quantitative measurement information.

As shown in the graph of FIG. 3, a displacement "profile" or "signature" of a weld produced in accordance with the process described herein begins at point 60 where the stud has been moved into contact with the workpiece. From point 60, the displacement curve begins with an upwardly tracking section 62 which corresponds to compression of the stud, with respect to the gun body 12, against a biasing spring as the ferrule is also moved into contact with the workpiece. At point 64 the stud and ferrule are both in contact with a surface of the workpiece and a "new zero displacement" point can thus be defined. Along with concurrent electrical arcing, the stud is then moved off of the workpiece in the "lift" motion along curve portion 66 to a maximum lift point 68. After a predetermined arcing time period, shown by flat portion 70, the "plunge" of the stud into the workpiece begins at point 74. Plunge continues along segment 76 as the stud is pushed into the molten pool, substantially linearly until point 78.

The curve continues non-linearly along path 80 until point 82 wherein stud 24 has reached a final welded position and has been released from the shaft 20 and chuck 22. For purposes of weld quality prediction in accordance with the method described herein, the displacement D occurring between graph points 74 and 78 will be referred to herein below as "plunge". The smaller displacement d is the amount of displacement occurring between "new zero" point 64 and point 78 and will be referred to as "effective plunge".

FIG. 4 shows a weld signature obtained from an incomplete weld, in this case a weld attempted to be made without the application of an electrical current purely for test purposes. As shown in the figure, compression 62 and lift 66 occur normally, just as shown in FIG. 3. However segment 76 is very short, with point 78 occurring at approximately the same relative displacement as point 64, thereby resulting in a non-existent "effective plunge" d and a relatively small plunge D.

FIG. 5 again illustrates a similar signature obtained from a weld found to have good quality and which physically withstood repeated hammer blows. Comparison of the signatures shown in FIGS. 3 and 5 to that of FIG. 4 clearly illustrates that the "effective plunge" d is a key parameter in displacement monitoring of the arc stud welding process. A good effective plunge, and therefore a weld predicted to be of good quality, at least from the standpoint of displacement monitoring, is indicated by segment 76 falling steeply below the "new zero" reference point 64.

While the displacement between a weld gun body and movable shaft has previously been measured for use in adaptively controlling the weld process lift and plunge motions via a stepping motor, for instance in U.S. Pat. No. 5,070,226 to Raycher et al., this type of displacement measurement has not heretofore been used to predict weld quality or impact strength in a process monitoring function as disclosed herein. The creation of a weld "signature" has been found to be very useful in predicting weld failures produced under conditions where more standard monitored parameters have indicated the likelihood of production of a "good" quality weld.

Situations leading to such circumstances include improper gun setup or adjustment, or improper lift and plunge speeds and distances. Insufficient plunge can result in an asymmetric and insufficient flash and therefore a weak weld. Excessive plunge can result in excessive weld flash and spatter and also a low to moderate strength weld. A too short lift distance may result in high welding current but low arc voltage. Despite the available current, a short lift reduces the amount of weld flash and lowers weld strength. Conversely, if the lift is too high, the arc voltage increases and the total burn-off may increase beyond the amount desired.

While the creation of a weld signature of the type shown in the graphs of FIGS. 3–5 provides a signature analysis type function, other types of uses of the displacement measurement data obtained by the present invention could alternately be used. For instance, "effective plunge", lift and plunge displacements could be extracted and tracked. Predefined ranges for effective plunge displacement could be established for a given welding application, such as by physically testing welds and comparing the results to the measured effective plunge displacements. Wide variances or out of tolerance measurements could be programmed to cause an audible signal to sound or could be used directly to interrupt a production line.

Displacement monitoring of arc stud welds, however, is not in and of itself infallible. A severely angled stud with low current and producing a large amount of expulsion to one side of the stud may exhibit an acceptable amount of effective plunge. However, this weld would be rejected using more traditional process monitoring methods due to low current, or possibly high voltage. Therefore, the preferred approach is to monitor multiple stud welding parameters including current, displacement, arc time and voltage.

This supplementation of more traditional stud weld process monitoring systems with the present novel process monitoring method is advantageous in situations wherein weld strength is very important. By enabling the prediction of weld quality, the use of expensive and inefficient destructive testing methods can be reduced. Determination of a problem at the weld site enables quick action and reduces the production of welds of marginal to poor quality and also enables statistical process control which identifies trends prior to the weld process going out of control.

The system and method of the present invention further provides a significant advantage in that it is readily adaptable to a variety of present and future welding system configurations and methods. It can thus be implemented using commonly available sensor and processor components without necessitating the purchase of specialized welding equipment. Interchangeability of the manner in which the displacement measurements are obtained and the types sensors used to obtain these measurements results in a system and method useful in a wide variety of applications.

The foregoing discussion discloses and describes an exemplary embodiment of the present invention. One skilled in the art will readily recognize from such discussion, and from the accompanying drawings and claims, that various changes and modifications can be made therein without departure from the spirit and scope of the invention as defined in the following claims.

What is claimed is:

1. In an arc stud welding system including a stud welding gun having a body and a movable gun shaft mounted to said body so as to provide reciprocal movement of said shaft with respect to said body, said shaft having a distal end having means for carrying a stud, wherein said welding cycle includes positioning said stud against a workpiece in a fully extended position of said shaft, compressing said shaft with respect to said gun into a compressed position of said shaft, lifting said stud off of said workpiece into a retracted position of said shaft and plunging said stud toward said workpiece to a plunged position of said shaft, a method of monitoring said stud welding process and predicting resulting weld quality, said method comprising the steps of:

positioning a sensor with respect to said welding system, said sensor being adapted to measure instantaneous discrete distances representative of relative displacement between said gun body and movable shaft;

electrically connecting a signal processing unit to said sensor, said signal processing unit adapted to associate each said discrete distance measurement with a unit of time;

associating certain of said discrete signal values with said compressed and plunged positions of said shaft;

determining an effective plunge displacement by subtracting a value associated with said compressed position of said shaft from a value associated with said plunged position; and predicting good weld quality when said effective plunge displacement falls within a predetermined range of effective plunge values.

2. The method of claim 1 wherein an electrical signal is applied by said weld gun to create an electrical arc between said stud and workpiece during the welding process and said method further includes the step of monitoring the current, voltage and duration of said applied electrical signal.

3. The method of claim 1 further comprising the step of graphically displaying each said discrete displacement distance with respect to time to obtain a displacement signature.

4. The method of claim 3 further comprising the step of comparing said displacement signature with a similar signature obtained in producing a weld of known quality.

5. The method of claim 1 wherein said predetermined range of effective plunge values are determined using the range of values obtained in producing a series of tested good quality welds.

6. The method of claim 1 wherein said sensor is a linear variable displacement transducer (LVDT) and further comprising the step of mounting said LVDT between said gun body and movable shaft.

7. The method of claim 1 wherein said sensor is an optical sensor positioned a predetermined distance from said welding system and adapted to determine the distance between a first target point on said gun body and a second target point on said movable shaft.

8. The method of claim 1 wherein said sensor includes a laser.

9. The method of claim 1 further comprising the step of associating certain discrete signal values with at least one of said fully extended and fully retracted positions of said shaft.

10. An arc stud welding system comprising:

a stud welding gun having a body and a movable gun shaft mounted to said body so as to provide reciprocal movement of said shaft with respect to said body between a compressed position and a plunged position, said shaft having a distal end having means for carrying a stud;

a sensor positioned with respect to said welding gun so as to measure discrete distances representative of the instantaneous relative displacement between said gun body and movable shaft, wherein said welding gun has a pair of target points, one said target point lying on an exterior surface of said gun body and a second target point on an exterior surface of said movable gun shaft, said sensor including means for measuring the relative displacement between said target points; and a signal processing unit electrically connected to said sensor and including processor means for associating certain of said discrete distance measurements with a unit of time as well as with said compressed and plunged positions of said shaft, said processing unit further including means for predicting resultant weld quality by subtracting a value associated with said compressed position of said shaft from a value associated with said plunged position of said shaft.

11. The system of claim 10 wherein said sensor includes an LVDT.

12. The system of claim 10 wherein said sensor includes a laser.

* * * * *